United States Patent [19]
Grill et al.

[11] Patent Number: 6,144,927
[45] Date of Patent: Nov. 7, 2000

[54] DATA TRANSMISSION DEVICE FOR A MOTOR VEHICLE, COMPRISING A PULSE GENERATOR AND A MONITORING UNIT, AS WELL AS A PULSE GENERATOR FOR THE MONITORING UNIT

[75] Inventors: Thomas Grill, Villingen-Schwenningen; Martin Gruler, Aixheim; Ludwig Büscher, Villingen-Schwenningen; Helmut Bacic, Königsfeld; Norbert Lais, Villingen-Schwenningen; Hartmut Schultze, Villingen-Schwenningen; Josef Wangler, Villingen-Schwenningen, all of Germany

[73] Assignee: Mannesmann VDO AG, Frankfurt, Germany

[21] Appl. No.: 08/945,102
[22] PCT Filed: Mar. 12, 1997
[86] PCT No.: PCT/EP97/01247
§ 371 Date: Sep. 14, 1998
§ 102(e) Date: Sep. 14, 1998
[87] PCT Pub. No.: WO97/35487
PCT Pub. Date: Oct. 2, 1997

[30] Foreign Application Priority Data

Mar. 15, 1996 [DE] Germany ............... 196 10 161

[51] Int. Cl.⁷ ............... G01S 5/02; H04B 7/185
[52] U.S. Cl. ............... 702/142; 701/70; 701/213; 701/214; 342/357; 342/386
[58] Field of Search ............... 702/142; 701/70, 701/93, 96, 119, 209, 214; 340/438; 324/151; 180/120; 477/62; 342/386, 357, 457

[56] References Cited

U.S. PATENT DOCUMENTS 5,731,785 3/1998 Lemelson et al. ............... 342/357

FOREIGN PATENT DOCUMENTS 0608651 8/1994 European Pat. Off. .
4202583 4/1993 Germany .

OTHER PUBLICATIONS

\* no. —, Oct. 10, 1990, Jackson J S. pp. 29–32, XP000222750 Cooke L: Sensor Technology and Signal Analysis: High Security Encryption Supervision.

\* Proceedings of the International Carnahan Conference on Security Technology: Crime Countermeasures, Lexington, Oct. 10–12, 1990.

*Primary Examiner*—Kamini Shah
*Attorney, Agent, or Firm*—Martin A. Farber

[57] ABSTRACT

A data-transmission device has a pulse generator (1) and a monitoring unit (20) for use in a vehicle. A signal generated by the sensor (2) is transmitted from the pulse generator (1) to the monitoring unit (20) by a signal line (9) and also, when requested by the monitoring unit, is transmitted in encrypted form along a data line (19). The signal generated by the pulse generator (1) is first stored in an intermediate store. Before transmission, the contents of this store are encrypted. On arrival in the monitoring unit, the encrypted signal is compared with the signal previously transmitted in the usual way and recorded there. This is a security check which reveals any manipulations which have been made during transmission.

15 Claims, 1 Drawing Sheet

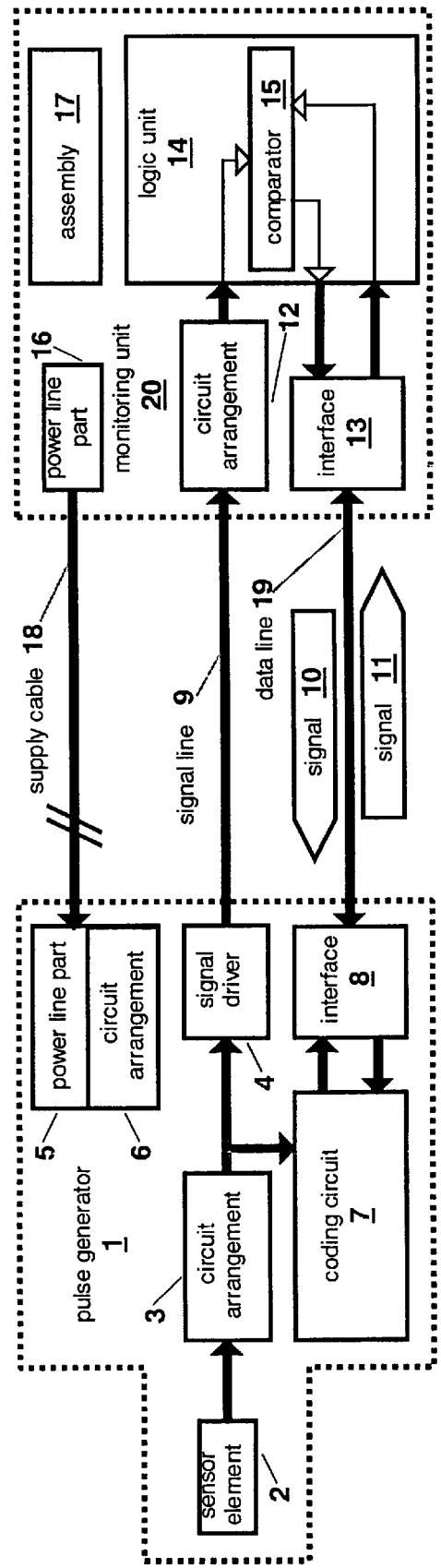

DATA TRANSMISSION DEVICE FOR A MOTOR VEHICLE, COMPRISING A PULSE GENERATOR AND A MONITORING UNIT, AS WELL AS A PULSE GENERATOR FOR THE MONITORING UNIT

FIELD AND BACKGROUND OF THE INVENTION

The present invention relates to a data transmission device for motor vehicles, comprising a pulse generator and a monitoring unit, as well as a pulse generator for the monitoring unit.

Pulse generators are customarily introduced into a vehicle transmission and, by the detection as a function of time of the change between tooth and tooth-gap of a rotating gear wheel, generate an electric signal which is modulated in proportion to the speed of the vehicle. This signal is fed to a monitoring unit for recording and evaluation, the monitoring unit being developed in road traffic, for instance, as recording speedometer, taximeter, log or similar device.

Such pulse generators generally have, in addition to the sensor element, a circuit arrangement for the processing of a first signal and a signal driver in order to prepare the signal detected by the sensor element, which is initially still subject to numerous disturbing influences, for the feeding thereof by wire to the monitoring unit in the rough environment of a motor vehicle. The supplying of current to electronics of the pulse generator is generally effected in this connection from the monitoring unit over electric connecting lines.

In the event that the monitoring unit is developed as a recording speedometer, the signal detected by the pulse generator is evaluated for monitoring uniting compliance with the social-welfare regulations length of driving and periods of rest for drivers and/or compliance with traffic regulations concerning with respect to the maximum speed permissible for the vehicle. For this purpose, the signal detected by the pulse generator is, as is known, frequently subjected to various manipulations in order generally to exert an illegal influence on the path of the transmission of the signal from the pulse generator to the monitoring unit. The countermeasures which have been applied up to now, which are directed at simultaneously transmitting an inverted signal with respect to the detected signal over another parallel line provided in addition to the signal line and then evaluate the two signals comparatively in the monitoring unit, have proven insufficient, since devices have become known which, when introduced into the transmission path from pulse generator to monitoring unit are able to simulate this double pulse of said monitoring unit without the illegal manipulating being detectable by recording in the monitoring unit.

SUMMARY OF THE INVENTION

It is an object of the present invention to improve the reliability of a data transmission device present in a vehicle which comprises of a pulse generator and a monitoring unit with regard to the signal to be transmitted and to provide a development of the pulse generator which is suitable for that purpose.

The data transmission device and pulse generator of the invention have the advantage of being compatible with the previously customary four-wire technique for the transmission path from the pulse generator to the monitoring unit since, as previously, two lines are required for the supplying of current and only two additional lines are required for the signal transmission. Due to the fact that the signal line which was once used for the transmission of the inverted signal is now used as data line—preferably for a bi-directional data transmission—no expensive multi-wire cables are necessary. Therefore, the data transmission device of the invention can be relatively easily retrofitted by replacement of the pulse generator and of the monitoring unit in an existing vehicle without incurring charges for the expensive laying of a new line.

Another advantage is that due to the fact that the signal detected by the sensor element of the pulse generator can also be transmitted further directly after its detection, i.e. in the form of a real-time signal, the traditional nature of the preparation of the signal in the pulse generator and in the monitoring unit can be retained. Thus circuit techniques which have proven satisfactory can continue to be used, which reduces the development expense for the creation of the data transmission device desired in accordance with the invention. Existing system components are advantageously supplemented, which leads to an inexpensive embodiment and faster acceptance by the customer.

It is particularly advantageous that the data signal which is processed as an encrypted signal need not be transmitted simultaneously with the unencrypted signal which is present as real-time signal since it is sufficient in practice for the manipulation testing to be effected only when needed. As a result, it is not necessary for the hardware resources present in the monitoring unit to be developed of higher power, but rather the easy inclusion of the solution found in the logic unit present in the monitoring unit is possible. Furthermore, the new functions can be realized also in the pulse generator by the implementation of relatively simple assemblies, so that the data transmission device of the invention can be produced inexpensively with respect to all its components.

Since the manipulation testing takes place only when needed, a low data transmission rate can be selected, as a result of which only rather easily satisfied requirements for the attachment of the data line need be made on the data interfaces to be provided in the pulse generator and the monitoring unit. Furthermore, a low data transmission rate also leads to an increase in the reliability of an interface. The retaining of the real-time signal furthermore contributes to the functional stability of the data transmission device, since even if the electronics for the production of the encrypted signal should fail at one time, a signal which can be evaluated with regard to the aforementioned criteria is nevertheless available due to the continuously transmitted real-time signal, even a proof of manipulation can now no longer be carried out if due to this partial system failure.

By the separation of the transmission of the real-time signal from the method of encryption, it is possible to keep the clock frequency of the encrypting circuit within the pulse generator relatively low, which has a very favorable effect on the electromagnetic radiation behavior, on the consumption of current, and in particular on the loss power, since the radiation by electronic logic modules is more intense the higher the clock frequency. Furthermore, the loss power is also directly proportional to the clock frequency.

The fact is that, since relatively simple assemblies can be used in the pulse generator, a data transmission device having the desired properties with respect to the reliability of the transmission under the extreme environmental conditions present in a vehicle is possible, since a pulse generator introduced into a vehicle transmission operates in the high temperature range of the ordinary specification of electronic silicon components. While semiconductor components do not necessarily fail suddenly under very high operating temperatures, their life however may be reduced thereby. In order nevertheless to assure the required certainty of operation, the electrical heat produced upon their operation by the circuit arrangement must definitely be kept slight, which is achieved in particular by the special nature of the components used and a low system clock.

The components necessary in the pulse generator for the obtaining of the solution found do not require a large amount of space, so that the geometry of modern pulse generators can be retained. This serves to alleviate the fact that the structural space available in vehicle transmissions for the introduction of a pulse generator is extremely limited.

One advantageous development of the encryption circuit in the pulse generator consists of realizing it by a microcontroller system. If the data line from the pulse generator to the monitoring unit is bidirectional, then the monitoring unit can call upon the pulse generator via this line to transmit the data which have been stored in the meantime. As an alternative, the transmission of the encrypted data by the pulse generator to the monitoring unit can, however, also be controlled in accordance with other criteria.

Preferably, the signal detected by the pulse generator is encrypted with the standard DES encryption method (Data Encryption Standard) since this encryption method is considered extremely reliable in accordance with the present state of the art. The reliability of this encryption method is based on the practical impossibility of calculating the code from a knowledge of the encrypted and unencrypted message.

Since identical detection signals also always produce the same encoded messages, it can furthermore be provided that a random value generated by the monitoring unit is transmitted encrypted in addition to the detection signal. In this way, any systematic relationship between an unencrypted signal and an encrypted signal is avoided with respect to the outside. Furthermore, for a further increase in the reliability of the data, the codes of the encryption method can always be changed again during the operation of the data transmission device.

The reliability in operation of the microcontroller system can be further increased in the manner that the features of a watchdog function and of a power-on reset are realized. Whenever the microcontroller system has been disturbed by manipulation or by other disturbing influences, for instance disturbing radiations (EMV), it must be brought back into a stable defined state after the termination of the disturbance. The monitoring unit recognizes a disturbance by the fact that a proper communication with the pulse generator is not possible.

The power-on reset responds upon an interruption in the voltage or upon low voltage in the supply line and is realized together with the power-supply part of the pulse generator. For the obtaining of the watchdog function, two variants are possible. Either the watchdog function which is directed on the microcontroller system is realized internally within the pulse generator so that upon failure of the microcontroller system, a reset command is given which reinitializes the microcontroller system, or the watchdog function is performed by the monitoring unit in the manner that the monitoring unit then causes the initializing of the microcontroller system of the pulse generator when there are no signal reports from the microcontroller system. For this, the monitoring unit pulls the data line for a certain amount of time to its lower signal level (LOW). When this is the case, then a monostable flip-flop responds in the pulse generator and triggers a control pulse as reset command for the initialization of the microcontroller system.

BRIEF DESCRIPTION OF THE DRAWINGS

With the above and other objects and advantages in view, the present invention will become more clearly understood in connection with the detailed description of a preferred embodiment, when considered with the accompanying drawing in which the sole FIGURE is a block diagram of the invention illustrating the data transmitting device of the invention and its manner of operation.

DETAILED DESCRIPTION OF THE PREFERRED EMBODIMENT

A pulse generator 1 is connected by a two-wire supply line 18, a signal line 9 and a data line 19 to a monitoring unit 20. The pulse generator 1 has a sensor element 2 for the detection of the frequency of rotation of a gear wheel, a circuit arrangement 3 for a first processing of the signal detected by the sensor element 2, and a signal driver 4 for the amplifying of this signal. The sensor element 2 can, for instance, be a Hall element. The signal generated by the sensor element 2 is advantageously converted into a frequency signal consisting of square pulses and is sent as such by the signal driver 4 over the signal line 9 to the monitoring unit 20. In the monitoring unit 20 there is provided a circuit arrangement 12 which receives the pulse signal which has been sent out and forwards it for recording to a logic unit 14. The recording includes a time-related counting of the pulses received. The signal driver 4 and the circuit arrangement 12 form the interfaces of the signal line 9.

Both in the monitoring unit 20 and in the pulse generator 1 there are power line parts 5 and 16 which are connected to each other by a supply cable 18 generally consisting of two wires. The electrical energy for the operating of the electronics in the pulse generator 1 is provided preferably by the monitoring unit 20. It is advantageous to expand the power line part of the pulse generator 1 by a circuit arrangement 6 for the voltage monitoring uniting, for instance an integrated voltage regulator, and by means for bringing about the power-on reset.

In accordance with the invention, the signal processed in the circuit arrangement 3 is also fed to a coding circuit 7 which is preferably developed as a microcontroller system. In the coding circuit 7, the square pulses of the signal are first of all summated in a counting register. When the monitoring unit 20 is called upon to transfer the counter reading, the counter reading in encrypted, for instance, with the standard data encryption method and sent to the monitoring unit via an interface 8 developed as a transmitting and receiving circuit.

After the signal sent over the data line 19 has been received by the interface 13 in the monitoring unit 20, which is also developed as transmission and receiving circuit, it is forwarded for decoding to the logic unit 14 of the monitoring unit, so that thereupon the real nature of the signal which has been transmitted previously over the signal line 9 can be determined in the comparator 15. For this purpose, the counter reading which has been received over the data line 19 and then deencrypted is compared, with reference to a specific period of time, with that counter reading which resulted from the recording of the square pulses transmitted over the signal line 9 in the memory of the monitoring unit 20. The assembly 17, summarizing, designates all means which are necessary for the carrying out of the other functions of the monitoring unit, which, however, will not be gone into further here since they are not directly related to the object of the invention.

By the initializing of the data transmission device, there is to be understood the transmission of the code from the monitoring unit 20 to the pulse generator 1. The initialization process accordingly differs from the operation of the data transmission device.

A master key is stored both in the coding circuit 7 of the pulse generator 1 and in the logic unit 14 of the monitoring unit 20. Upon the initializing of the data transmission device, a new random code is generated in the logic unit 14 of the monitoring unit 20. This new code is encrypted with the aid of the master code in the logic unit 14 and transmitted over the data line 19 to the pulse generator 1. The new key is decoded in the pulse generator 1 on basis of the master key stored there and is deposited in a memory forming part of the coding circuit 7. The new key is only valid when it has been confirmed by the monitoring unit 20 (semaphore principle). For this purpose, the master key is coded with the new key in the pulse generator 1 and upon being called for by the monitoring unit 20 is transferred to the monitoring unit 20. Only after a verification effected in the monitoring unit 20, is, in the event of a positive result, the new key actuated by a report to the coding circuit 7 of the pulse generator 1, as a result of which the "operating mode" is turned on in the pulse generator 1.

Furthermore, it is assumed that the memory in the pulse generator is developed as a counter register, which is a preferred embodiment. During the operation of the data transmission device, substantially only two commands are necessary for the data traffic on the data line 19, these commands being directed by the logic unit 14 of the monitoring unit 20 for control of the behavior of the coding circuit 7 in the pulse generator 1 to the coding circuit 7. These are commands which (1) read and code the counter reading from the counter register and (2) transmission the coded counter reading. Also for the transmission of the key, only three commands are necessary, namely (3) a command to receive a coded key, decode it and code the master key with the new key, (4) a command to send the coded master key back, and (5) a command to confirm the new code. Thus, the communication between the pulse generator 1 and the monitoring unit 20 can be limited to a total of five commands. In the block diagram, the signal which is transferred from the logic unit 14 in the monitoring unit 20 to the coding circuit 7 in the pulse generator 1 via the data line 19 and contains commands and data is combined under the reference numeral 10. The signal containing only data, which is transmitted in the opposite direction, is designated by the reference numeral 11. The monitoring unit 20 thus acts as master with respect to the microcontroller system in the pulse generator 1, since the microcontroller system of the pulse generator reacts like a slave only after being called upon from the outside by commands fed.

The data transmission device developed in accordance with the invention recognizes whether the signal line or the data line are placed on defined levels, whether the signal line or the data line are switched to a second (system-foreign) pulse generator, whether the transmitter signal is externally fed, whether a pulse divider is interposed in the data line or the signal line, whether the data-containing signal transmitted on the signal line or on the data line has been bypassed for listening over a longer time and, if the power-line part 5 of the pulse generator 1 has been expanded by a circuit arrangement 6 for the monitoring of the voltage, whether the voltage supply in the supply line is weakened in its amplitude, for instance by an interposed potentiometer.

A data transmission device provided with the features mentioned above therefore recognizes every common manipulation on any one of its connecting lines, since, after the initialization of the data transmission device, the pulse generator and monitoring unit are associated with each other in a non-confusable manner by the establishing, transmission and verifying of an identification feature.

What is claimed is:

1. A data transmission device for a motor vehicle, comprising a pulse generator, a monitoring unit, and two separate communication channels interconnecting said pulse generator with said monitoring unit, the pulse generator (1) containing a sensor element (2) for generating a first electric signal which is modulated in proportion to a speed of the vehicle, wherein a) the pulse generator (1) comprises a circuit arrangement (3) outputting a modulated first signal by modulating the first signal of the sensor element (2) in a series of square pulses;

b) the pulse generator (1) comprises a first memory for recording the square pulses, and a coding circuit (7) for coding a content of the first memory to ouput an encoded signal having data of the first signal;

c) said pulse generator (1) and said monitoring unit (20) are connected to each other both by a signal line (9) of a first of said communication channels and by a data line (19) of a second of said communication channels;

d) the signal line (9) transmits the modulated first signal of the sensor element (2) uncoded to the monitoring unit;

e) the data line (19) transmits the encoded signal to the monitoring unit (20);

f) the monitoring unit (20) has a second memory for recording the modulated first signal which is continuously transmitted via the signal line (9);

g) the monitoring unit (20) comprises a logic unit (14) for decoding the encoded signal received over the data line (19) to produce a decoded signal; and h) the monitoring unit (20) further comprises a comparator 15 which, in combination with said logic unit (14), compares the decoded signal with the modulated first signal transmitted over the signal line (9) and stored in the monitoring unit (20) so as to verify validity of the modulated first signal with respect to a defined period of time.

2. A data transmission device according to claim 1, wherein a same master code is stored both in the coding circuit (7) of the pulse generator (1) and in the logic unit (14) of the monitoring unit (20).

3. A data transmission device according to claim 1, wherein the coding circuit (7) provided in the pulse generator (1) codes the signal generated by the sensor element (2) in accordance with data encryption standard (DES).

4. A data transmission device according to claim 1, wherein the coding circuit (7) in the pulse generator (1) is formed by a microcontroller system.

5. A data transmission device according to claim 1, wherein the memories provided in the pulse generator (1) and in the monitoring unit (20) are counter registers for the recording of the pulses.

6. A data transmission device according to claim 1, further comprising interfaces (8 and 13) located at ends of the data line (19) in respectively the pulse generator and the monitoring unit, and wherein the data line (19) between the pulse generator (1) and the monitoring unit (20) with their interfaces (8 and 13) is developed for a bidirectional data transmission.

7. A data transmission device according to claim 1, wherein communication carried out over the data line (19) between the pulse generator (1) and the monitoring unit (20) is controlled by the monitoring unit (20).

8. A pulse generator for a data transmission device, the latter comprising said pulse generator and a monitoring unit in a motor vehicle, the pulse generator having a sensor element for generating a sensor signal modulated in proportion to speed of travel of the vehicle, and further comprising:
- a circuit arrangement (3) for signal processing which modulates the sensor signal generated by the sensor element (2) into a series of square pulses;
- a memory for registering the square pulses, and a coding circuit (7) for coding a content of said memory; and
- interfaces (4 and 8) for connection of the pulse generator (1) with the monitoring unit (20) by a signal line (9) which carries said series of square pulses and a data line (19) which carries an output of said coding circuit.

9. A pulse generator according to claim 8, wherein a master key is stored in the coding circuit (7).

10. A pulse generator according to claim 8, wherein the coding circuit (7) codes the signal generated by the sensor element (2) in accordance with data encryption standard.

11. A pulse generator according to claim 8, wherein the coding circuit (7) is a microcontroller system.

12. A pulse generator according to claim 8, wherein the memory is a counter register for the recording of the pulses.

13. A pulse generator according to claim 8, wherein one of said interfaces (8) is developed for attachment of said data line (19) for bidirectional data transmission.

14. A pulse generator according to claim 11, wherein in combination with the microcontroller system, there is a watchdog function and a power-on reset.

15. A pulse generator according to claim 9, wherein the coding circuit (7) codes the signal generated by the sensor element (2) in accordance with data encryption standard.

* * * * *